Aug. 11, 1942.          P. K. McGALL ET AL          2,292,953
                        CAMERA SYNCHRONIZER
                        Filed Oct. 23, 1940
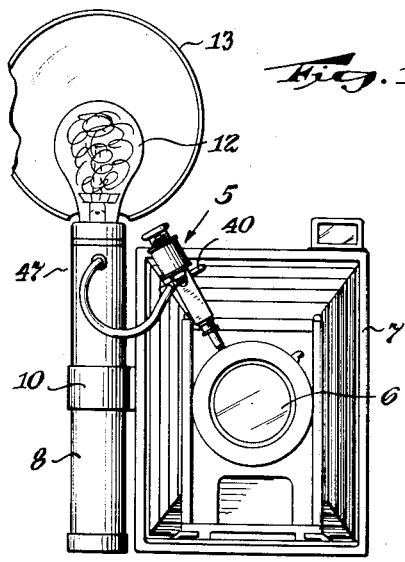
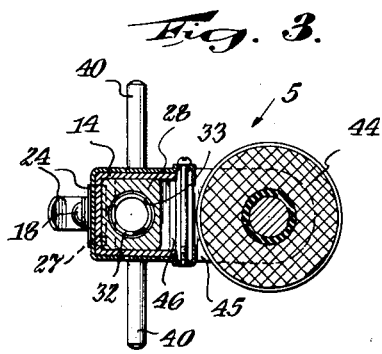
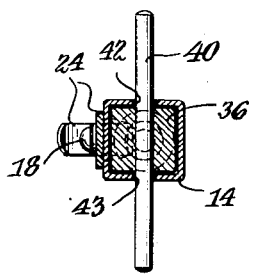
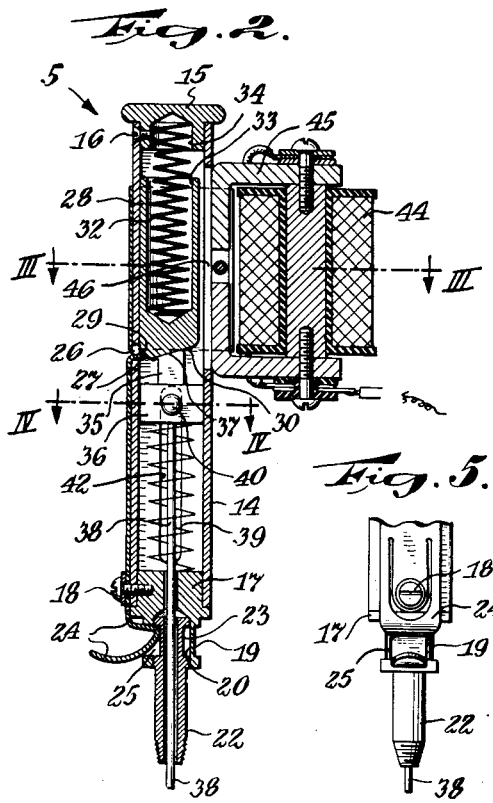
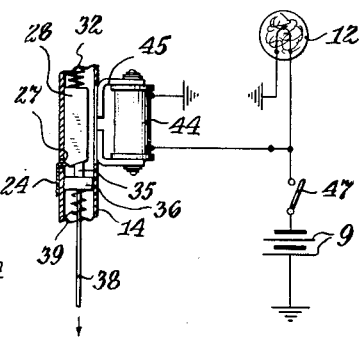
INVENTOR
P. K. McGALL
R. H. DEALTRY
BY
J. W. Greenhowe
ATTORNEY Patented Aug. 11, 1942

2,292,953

UNITED STATES PATENT OFFICE 2,292,953

CAMERA SYNCHRONIZER

Philip K. McGall, Orange, and Robert H. Dealtry, Berkley Heights, N. J., assignors to Samuel Mendelsohn, Montclair, N. J.

Application October 23, 1940, Serial No. 362,364

5 Claims. (Cl. 67—29)

The present invention relates to synchronizers for completely opening a camera shutter at the moment of peak intensity from a photoflash lamp and particularly to such a device which is exceptionally economical to manufacture, and can be readily installed on any camera.

Devices of this type are now well known in the art but due to their relatively high cost they have not been utilized to any substantial extent by the average amateur photographer.

It is accordingly an object of the present invention to provide a synchronizer for camera shutters which is simple in construction and economical to manufacture.

Another object of the present invention is the provision of a simply constructed synchronizer for camera shutters which can be readily installed by the average amateur photographer on substantially any type of camera.

Still further objects of the present invention will become obvious to those skilled in the art by reference to the accompanying drawing wherein:

Fig. 1 is a front elevational view of a camera provided with a synchronizer constructed in accordance with the present invention;

Fig. 2 is a cross-sectional view on an enlarged scale of the synchronizer of the present invention and as shown in Fig. 1;

Fig. 3 is a cross-sectional view taken on the line III—III of Fig. 2;

Fig. 4 is a cross-sectional view taken on the line IV—IV of Fig. 2;

Fig. 5 is a fragmentary elevational view of the present synchronizer as shown in Fig. 2, and Fig. 6 is a diagrammatic illustration of the electrical circuit employed in the synchronizer of the present invention.

Referring now to the drawing in detail a synchronizer 5 constructed in accordance with the present invention is shown in Fig. 1 attached to the shutter 6 of a camera 7. A metallic casing 8, housing a pair of dry cell batteries 9 (Fig. 6) is shown affixed to the camera by any suitable means, such as by a bracket 10. The top of the casing is provided with a socket supporting a photoflash lamp 12 which is provided with a reflector 13 for directing the light from the lamp toward the object to be photographed.

By reference now more particularly to Fig. 2, it will be noted that the synchronizer 5 comprises a cylindrical metallic member 14 closed at one end by a plug 15 which is held in place by a screw or the like 16. In a similar manner the opposite end of the cylindrical member 14 is closed by a plug 17 held in place by a screw 18 and this latter plug protrudes beyond the end of the cylindrical member 14 where it is provided with an annular groove 19 and an annular recess 20.

This annular recess 20 telescopically receives a threaded thimble 22 which screws into the camera shutter in place of the usual fitting attached to the cable release. An annular groove 23, similar to the groove 19, is provided in the thimble 22 and in order to hold the latter in place a spring clip 24 secured to the screw 18 passes through a slot 25 in the groove 19. As shown, the spring clip 24 extends longitudinally of the cylindrical member 14 for a substantial distance and is then bent angularly through an opening 26 in the wall of the cylindrical member to form a stop pin 27.

Disposed interiorly of the member 14 is a plunger 28 of substantially less diameter than the interior of the member 14 so as to allow lateral movement of the plunger as hereinafter more fully stated. The plunger 28 is provided with an end having two angularly converging surfaces 29 and 30 of different area, the smaller 29 of which is adapted to be engaged by the stop pin 27. In order to maintain the surface 29 of the plunger 28 in engagement with the pin 27 and the device in "cocked" position, a coil spring 32 is disposed between a longitudinal bore 33 in the plunger and a recess 34 in the end plug 15 so as to be compressed when the plunger is in latched position as shown in Fig. 2.

The larger area surface 30 is engaged by a shutter actuating member comprising an annular lug 35 secured to an annular block 36 and having an angular end surface 37 which coincides with the larger area surface 30 of the plunger 28. A push rod 38 is secured to the block 36 and extends through the thimble 22 a sufficient distance to trip the camera shutter 6 when the thimble is screwed in place. To prevent gravitation of the block 36 and disengagement of the angular surface 37 from the plunger surface 30, a second coil spring 39 is provided between the underside of the block 36 and the end plug 17.

As shown more clearly in Figs. 3 and 4, a short rod 40 passes through the block 36 and through longitudinally extending slots 42 and 43 in the cylindrical member 14 which is grasped by the fingers of the operator to compress the spring 32 and latch or "cock" the plunger 28 in engagement with the stop pin 27. For the purpose of tripping the synchronizer a solenoid 44 is secured to the cylindrical member 14 in any suitable manner and in order to increase the effect of its magnetism when energized, the iron core 45 of the solenoid extends through a longitudinal slot 46 in the member 14 so as to dispose the core 45 in closer proximity to the plunger 28. As can be seen in Fig. 6 one end of the solenoid winding is grounded by being connected to the metallic parts of the device as is one side of the batteries 9 and the shell of the socket for the photoflash lamp 12. Inasmuch as the other end of the solenoid winding as well as the center contact of the photoflash lamp socket are connected to the other side of the batteries 9 upon closure of the switch 47 carried by the battery casing 8, the solenoid and photoflash lamp are thus simultaneously energized.

Upon energization of the solenoid 44, the plunger 28 is moved laterally within the cylindrical member 14 toward the solenoid a distance sufficient to cause the stop pin 27 to disengage the angular surface 29. The potential energy stored within the compressed spring 32 accordingly causes rapid downward movement of the plunger 28 which naturally carries with it the shutter actuating member so that the push rod 38 opens the camera shutter 6.

The parts of the synchronizer, and particularly the strength of the compression spring 32 and the weight of the plunger 28, the inertia of which must be overcome, are so designed that by the time they go through their cycle of operation to completely open the camera shutter 6 the photoflash lamp, which has a known time lag, will have reached its moment of peak intensity.

Following the taking of an exposure the operator merely grasps the rod 40 with his fingers and raises the shutter actuating member which again compresses the spring 32. Moreover, due to the coinciding angular surfaces 37 and 30 on the shutter actuating member and on the plunger 28, the latter is first forced laterally toward the solenoid because of the thrust exerted enabling it to pass the stop pin 27 until the smaller angular surface area 29 is in alignment with the pin 27 which then retains the plunger in "cocked" position upon removal of the operator's fingers.

It should also be noted that rotary movement of the shutter actuating member is prevented by the rod 40 protruding through the longitudinal slots 42 and 43. Likewise rotary movement of the plunger 28 is prevented by the tension exerted by the spring 32 both in a longitudinal direction and in a radial direction so that there is no possibility of the coinciding surfaces 30 and 37 getting out of alignment.

It thus becomes obvious to those skilled in the art that a synchronizer for camera shutters is herein provided which is exceptionally simple in construction and economical to manufacture. Moreover, because of its simplicity it can be readily attached to substantially any make of camera by the average amateur photographer and once adjusted at the factory it is substantially foolproof and will maintain accurate synchronization for practically the entire life of the synchronizer.

Although one specific embodiment of the present invention is herein shown and described, it is to be understood that other modifications thereof may be made without departing from the spirit and scope of the appended claims.

What is claimed is:

1. A synchronizer for opening a camera shutter simultaneously with the moment of peak intensity of a photoflash lamp comprising a casing detachably connected to the camera shutter, a shutter actuating member in said casing adapted to be moved to cause opening of said camera shutter, a latch member carried by said casing, potential energy storage means in said casing, a plunger of preselected weight and operable to store energy in said energy storage means and movable into engagement with said latch member, and a solenoid attached to said casing and energizable simultaneously with the photoflash lamp to overcome the inertia of said plunger and cause lateral movement thereof and disengagement of said plunger from said latch member to render said energy storage means effective to cause longitudinal movement of said plunger with attendant movement of said shutter actuating member to open said camera shutter.

2. A synchronizer for opening a camera shutter simultaneously with the moment of peak intensity of a photo-flash lamp comprising a casing detachably connected to the camera shutter, a shutter actuating member in said casing adapted to be moved to cause opening of said camera shutter, a latch member carried by said casing, a compression spring in said casing, a plunger of preselected weight in said casing and manually movable into engagement with said latch member and operable to compress said spring to condition said synchronizer for operation, and a solenoid attached to said casing and energizable simultaneously with the photoflash lamp to overcome the inertia of said plunger and cause lateral movement thereof and disengagement of said plunger from said latch member to render said spring effective to cause longitudinal movement of said plunger with attendant movement of said shutter actuating member to open said camera shutter.

3. A synchronizer for opening a camera shutter simultaneously with the moment of peak intensity of a photoflash lamp comprising a casing detachably connected to the camera shutter, a shutter actuating member in said casing adapted to be automatically moved to cause opening of said camera shutter, a spring pressed plunger of preselected weight in said casing adapted to be tensioned by manual movement of said shutter actuating member and operable upon release thereof to cause automatic movement of said shutter actuating member with attendant opening of said camera shutter, a latch member engageable with said plunger for retaining the latter under tension ready for operation, and a solenoid carried by said casing provided with an iron core adjacent an opening in said casing in juxtaposition to said plunger and energizable simultaneously with the photoflash lamp to overcome the inertia of said plunger and cause lateral movement thereof and disengagement of said plunger from said latch member to render said plunger effective to automatically move said shutter actuating member.

4. A synchronizer for opening a camera shutter simultaneously with the moment of peak intensity of a photoflash lamp comprising a casing detachably connected to the camera shutter, a shutter actuating member in said casing adapted to be automatically moved to cause opening of said camera shutter, a latch member carried by said casing, a compression spring in said casing, a plunger of preselected weight in said casing movable rearwardly of said latch member and into engagement therewith upon movement of said shutter actuating member and operable to compress said spring to condition said synchronizer for operation, said shutter actuating member and said plunger being provided with complementary angular surfaces to cause lateral movement of said plunger until the latter passes rearwardly of said latch member into engagement therewith, and a solenoid attached to said casing and energizable simultaneously with the photoflash lamp to overcome the inertia of said plunger and cause lateral movement thereof and disengagement of said plunger from said latch member to render said spring effective to cause longitudinal movement of said plunger with attendant automatic movement of said shutter actuating member to open said camera shutter.

5. A synchronizer for opening a camera shutter simultaneously with the moment of peak intensity of a photoflash lamp comprising a casing detachably connected to the camera shutter, a shutter actuating member in said casing adapted to be automatically moved to cause opening of said camera shutter comprising a spring pressed head carried by a shutter operating rod to prevent gravitation of said member, a latch member carried by said casing, a compression spring in said casing, a plunger of preselected weight in said casing and engageable with said latch member upon manual movement of said shutter actuating member longitudinally of said casing with attendant compression of said spring to condition said synchronizer for operation, said spring pressed head and said plunger being provided with complementary angular surfaces engageable with each other to cause a slight lateral movement of said plunger relative to said casing until the plunger passes rearwardly of said latch member into engagement therewith, and a solenoid attached to said casing and energizable simultaneously with the photoflash lamp to overcome the inertia of said plunger and cause lateral movement thereof and disengagement of said plunger from said latch member to render said spring effective to cause longitudinal movement of said plunger with attendant movement of said shutter actuating member to open said camera shutter.

PHILIP K. McGALL.
ROBERT H. DEALTRY.